(12) United States Patent
Adkin

(10) Patent No.: US 9,636,752 B2
(45) Date of Patent: May 2, 2017

(54) MULTI-PURPOSE LAYOUT TOOL AND DRILL GUIDE, AND RELATED COMPONENTS

(71) Applicant: Robert William Adkin, Victoria (CA)

(72) Inventor: Robert William Adkin, Victoria (CA)

( * ) Notice: Subject to any disclaimer, the term of this patent is extended or adjusted under 35 U.S.C. 154(b) by 126 days.

(21) Appl. No.: 14/676,654

(22) Filed: Apr. 1, 2015

(65) Prior Publication Data
US 2015/0283623 A1 Oct. 8, 2015

Related U.S. Application Data

(60) Provisional application No. 61/975,075, filed on Apr. 4, 2014.

(51) Int. Cl.
*B23B 47/28* (2006.01)
*B25H 7/02* (2006.01)
*B23B 49/02* (2006.01)

(52) U.S. Cl.
CPC ............ *B23B 47/281* (2013.01); *B25H 7/02* (2013.01); *B23B 47/28* (2013.01); *B23B 47/287* (2013.01); *B23B 49/02* (2013.01); *B23B 49/026* (2013.01); *B23B 2247/10* (2013.01); *B23B 2247/12* (2013.01); *B23B 2247/18* (2013.01); *B23B 2260/092* (2013.01); *B23B 2260/094* (2013.01); *B23B 2260/104* (2013.01); *Y10T 408/21* (2015.01); *Y10T 408/567* (2015.01); *Y10T 408/568* (2015.01); *Y10T 408/569* (2015.01); *Y10T 408/56245* (2015.01)

(58) Field of Classification Search
CPC ............ Y10T 408/567; Y10T 408/568; Y10T 408/56245; Y10T 408/569; B23B 47/28; B23B 47/287; B23B 49/02; B23B 49/026; B23B 2247/10; B23B 2247/12; B23B 2247/18
USPC .................. 33/339, 353, 392, 18.1, 290, 295
See application file for complete search history.

(56) References Cited

U.S. PATENT DOCUMENTS

| | | | | |
|---|---|---|---|---|
| 1,317,285 | A * | 9/1919 | Glaude | B23B 47/28 408/97 |
| 1,473,877 | A * | 11/1923 | Rome | G01C 15/00 33/350 |
| 1,635,857 | A * | 7/1927 | Murray | G01C 15/10 33/353 |
| 2,428,201 | A * | 9/1947 | Cannarili | B23B 47/28 408/72 R |
| 2,848,785 | A * | 8/1958 | Bachli | B23D 51/04 269/127 |
| 2,932,995 | A * | 4/1960 | Durfee | B23B 47/281 269/268 |
| 3,218,059 | A * | 11/1965 | Andrew | B23Q 3/104 269/271 |
| 3,238,624 | A * | 3/1966 | McCabe | B23B 35/005 33/23.03 |

(Continued)

FOREIGN PATENT DOCUMENTS

JP 01121113 A * 5/1989

*Primary Examiner* — Daniel Howell
*Assistant Examiner* — Yasir Diab
(74) *Attorney, Agent, or Firm* — Janeway Patent Law PLLC

(57) ABSTRACT

A multi-purpose layout tool and drill guide, and related components and accessories, including a mounting L bracket, laser, swivels stand, headband and lamp.

15 Claims, 8 Drawing Sheets

(56) References Cited

U.S. PATENT DOCUMENTS

| | | | | |
|---|---|---|---|---|
| 3,261,098 A * | 7/1966 | Twist, Jr. | ............... | B43K 8/16 33/18.1 |
| 3,436,155 A * | 4/1969 | Perin, Jr. | ............... | B23B 49/026 356/138 |
| 3,464,295 A * | 9/1969 | Gallion | ............... | B23Q 1/5462 408/112 |
| 4,005,945 A * | 2/1977 | Gutman | ............... | B23B 47/281 269/87.3 |
| 4,323,100 A * | 4/1982 | Silken | ............... | B23Q 17/22 144/154.5 |
| 4,445,678 A * | 5/1984 | George | ............... | B23Q 3/104 269/282 |
| 5,183,373 A * | 2/1993 | Floyd, Jr. | ............... | B23Q 1/4804 144/144.51 |
| 5,800,099 A * | 9/1998 | Cooper | ............... | B23B 47/281 408/1 R |
| 5,915,891 A * | 6/1999 | Fridman | ............... | B23B 47/28 408/1 R |
| 7,131,796 B2 * | 11/2006 | Rooney | ............... | B23B 47/28 408/115 B |
| 8,309,875 B2 * | 11/2012 | Berger | ............... | B23B 47/28 219/69.11 |
| 2003/0218469 A1 * | 11/2003 | Brazell | ............... | G01V 3/15 324/637 |

* cited by examiner

MULTI-PURPOSE LAYOUT TOOL AND DRILL GUIDE, AND RELATED COMPONENTS

CROSS REFERENCE TO RELATED APPLICATIONS

This application claims the benefit of U.S. Provisional Patent Application No. 61/975,075, filed 4 Apr. 2014.

FIELD OF THE INVENTION

The present invention relates to the field of hand tools for use in the construction, automotive, and marine trades and related industries.

BACKGROUND OF THE INVENTION

It is common in the construction trades and related industries to purchase, transport, use, and maintain several separate, cumbersome and expensive hand tools to perform the particular functions of those separate hand tools.

SUMMARY OF THE INVENTION

In one aspect, the present invention provides a drill guide and layout tool including: a block member; two spaced-apart V-jigs projecting from the block member, wherein each V-jig has a V-shaped opening defined by two angled apart V-sides and having two V-tips, one V-tip at the distal end of each V-side, and the V-shaped openings are aligned such that together the V-shaped openings define a V-jig axis passing through the bottom of each V-shaped opening; and a center drill guide hole through the block member at a location centered between the V-jigs and aligned with the V-jig axis; wherein, the tool may be used to guide a drill by: in the case of longitudinally extending material of an appropriate size and configuration, placing the tool against the material with the V-jig axis aligned with the longitudinal axis of the material; or in the case of longitudinally extending material having a profile that does not permit aligned insertion within the V-shaped openings or a non-longitudinally extending material having a complex curved surface, bringing the four V-tips into contact with the material.

In each V-jig, the V-sides may be angled apart 90 degrees.

The drill guide and layout tool may include one or more additional drill guide holes through the block member and aligned with the V-jig axis, and each additional drill guide hole may be a different size from the center drill guide hole.

The block member may include a first leveling means for orienting the V-jig axis vertically; and at least one of the V-jigs may define a V-jig support extending normal to the V-jig axis; and the drill guide and layout tool may include a laser having a laser axis that is parallel to the V-jig axis when the laser is in aligned insertion within the V-shaped openings and that is perpendicular to the V-jig axis when the laser is supported by the V-jig support. The laser may include ferromagnetic material and the block member may include one or more magnets for releasably securing the laser in position when in aligned insertion within the V-shaped openings and when supported by the V-jig support. The first leveling means may include a bull's eye spirit level. The block member may include a second leveling means, being a tubular level configured for leveling the block member with the V-jig axis horizontal.

The block member may include a scribing array for use with a pencil or other scribing tool in scribing curves, the scribing array including: at least a first anchor hole through the block member and configured for insertion of a fastener therethrough; the center drill guide hole, wherein the center guide hole is configured for supporting a scribing tool; and a plurality of scribe holes through the block member and configured for supporting a scribing tool, and along with the center drill guide hole, spaced apart in first increments from the first anchor hole; whereby a user may scribe a curve of one of a desired first set of radii by inserting a fastener through the first anchor hole at the center of the curve and inserting a scribing tool into the one of the scribe holes and center drill guide hole providing the desired radius from the first set of radii.

The scribing array may include: a second anchor hole through the block member and configured for insertion of a fastener therethrough; and a plurality of additional scribe holes, along with the center drill guide hole, spaced apart in second increments from the second anchor hole; whereby a user may scribe a regular curve of a desired second set of radii by inserting a fastener through the second anchor hole at the center of the curve and inserting a scribing tool into the one of the additional scribe holes and center drill guide hole providing the desired radius form the second set of radii.

A loop of string may be secured to the block member for use in suspending the block member as a plumb bob, in that the block member may include a plumb slot intersecting the first anchor hole, whereby a loop of string may be inserted into the plumb slot and secured therein by inserting a fastener into the first anchor hole through the loop of string.

The block member may include a plurality of drill guide bores. The block member may include two spaced apart opposed parallel faces and a drill guide bore oriented at 45 degrees to the faces. The block member may include a 1/16 inch drill bit guide including an enlarged opening for accommodating a drill chuck containing a 1/16 inch drill bit.

The drill guide and layout tool may include a swivel mount having a swivel mount component of a ferromagnetic connector, and an articulating joint releasably fixable in various swivel orientations; and the block member may include: a first leveling means, being a bull's eye spirit level, for orienting the V-jig axis vertically; a second leveling means, being a tubular spirit level, for orienting the V-jig axis horizontally; a first side that is planar and normal to the V-jig axis; a second side that is planar and normal to the second side, wherein the first and second sides define planes that intersect at 90 degrees, two block member components of a ferromagnetic connector, one in the first side and another in the second side; whereby, the swivel mount may be ferromagnetically connected to either of the first side or second side, and the block member may be releasably positioned with the V-jig axis oriented vertically or horizontally using the articulable joint and one or the other of the bull's eye spirit level and the tubular spirit level.

The swivel mount may include a second swivel mount component of a ferromagnetic connector; and the drill guide and layout tool may include an L bracket including bracket components of ferromagnetic connectors wherein the L bracket may be ferromagnetically attached to a suitable surface and the swivel mount may be ferromagnetically connected to the L bracket, whereby the L bracket may be used to support the swivel mount and block member.

The ferromagnetic connectors may be rare earth magnets.

The block member may included at least one of, protractor markings, scribe array markings, drill guide size markings, linear measurement markings, and depth markings.

DETAILED DESCRIPTION WITH REFERENCE TO THE DRAWINGS

Figure 1:
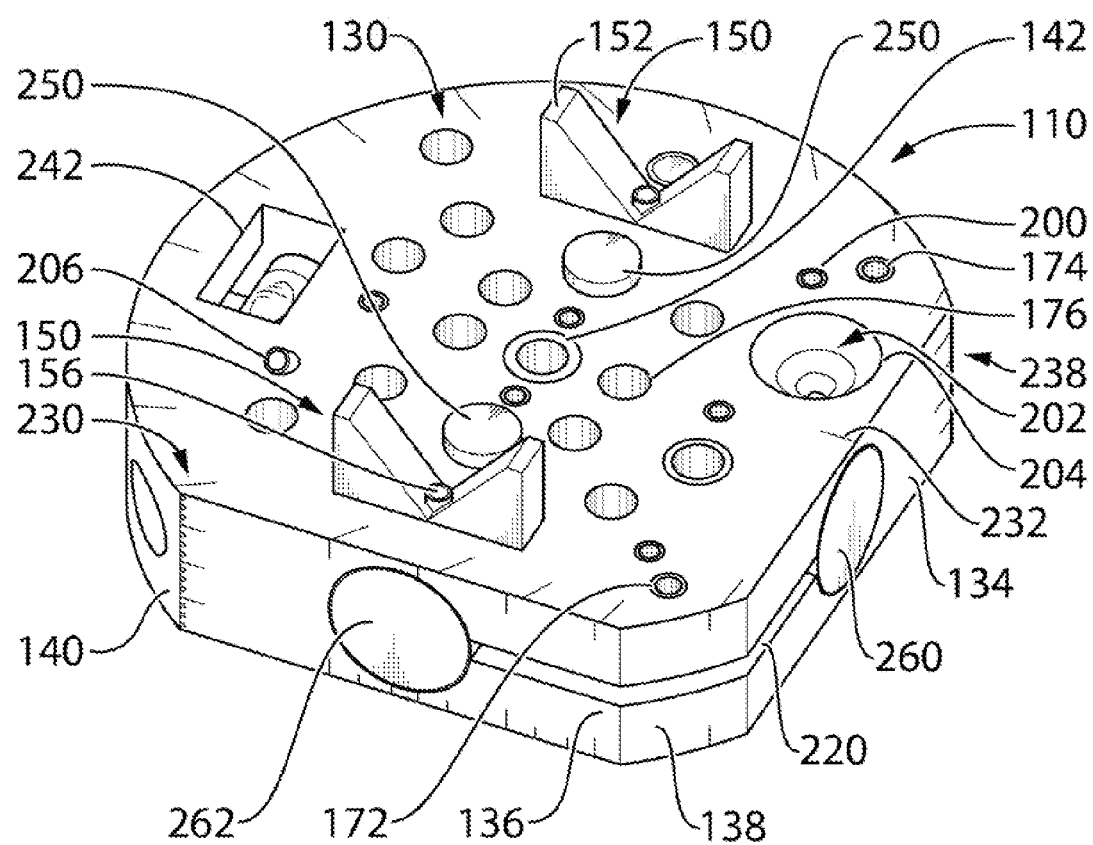
FIG. 1 is a perspective view showing the front face, left side, corner span and bottom side of a layout and guide tool embodiment of the present invention.
Figure 2:
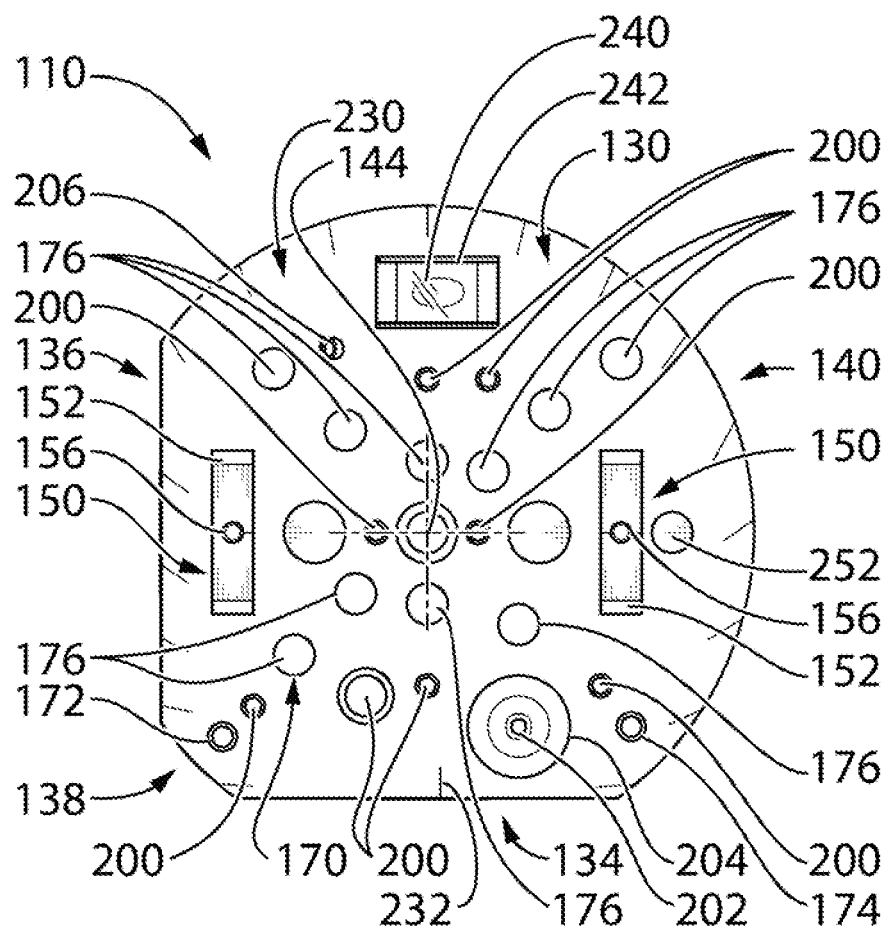
FIG. 2 is an orthogonal view of the guide face of the layout and guide tool embodiment of FIG. 1.
Figure 3:
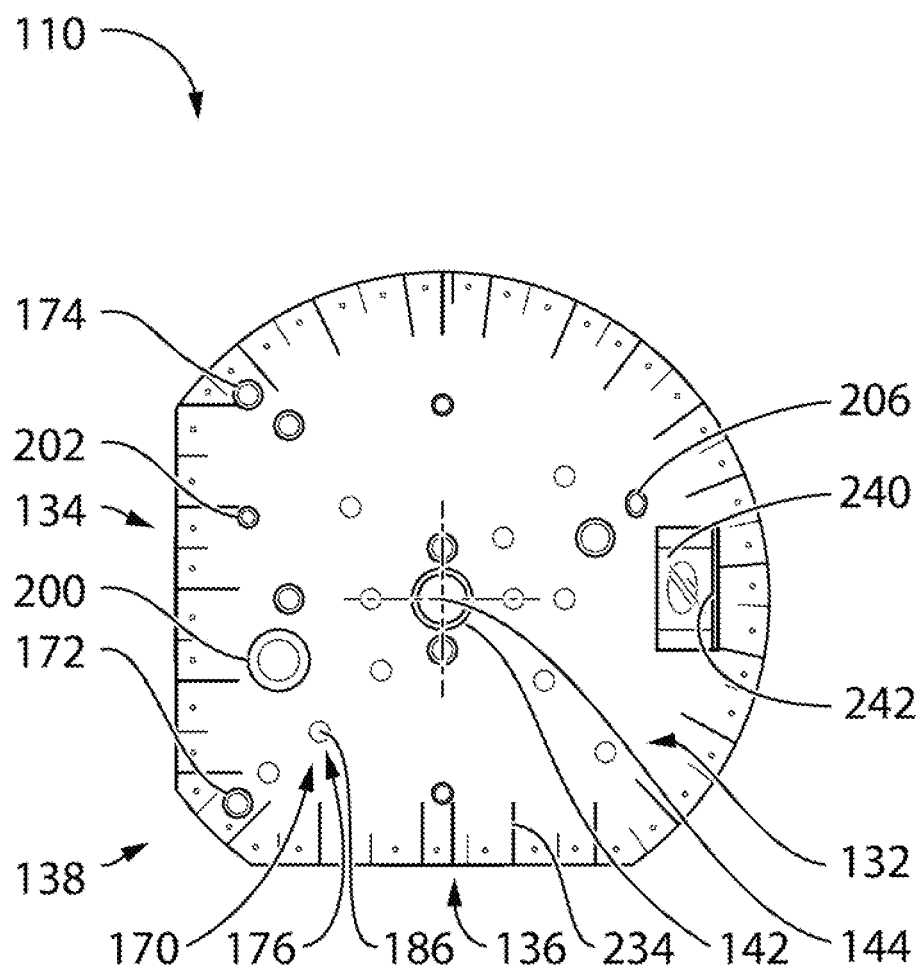
FIG. 3 is an orthogonal view of the front face of the layout and guide tool embodiment of FIG. 1.
Figure 4:
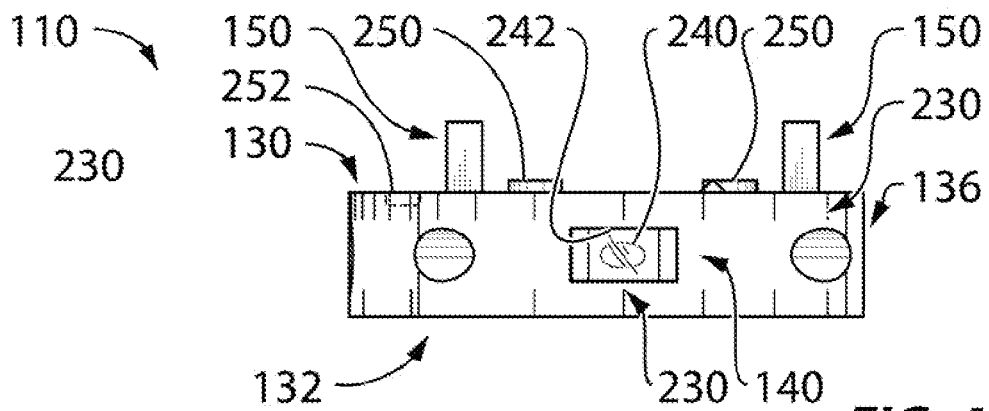
FIG. 4 is an orthogonal view of the layout and guide tool embodiment of FIG. 1, showing a portion of the curved side containing the tubular spirit level.
Figure 5:
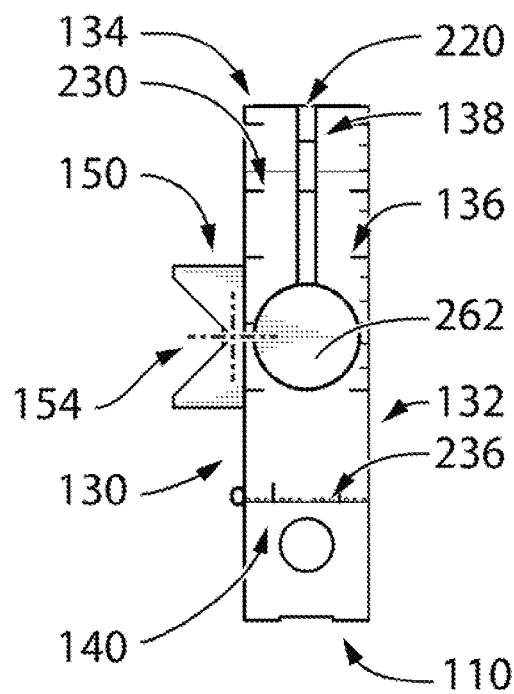
FIG. 5 is an orthogonal view of the layout and guide tool embodiment of FIG. 1, showing a portion of the curved side, the left side and the corner span.
Figure 6:
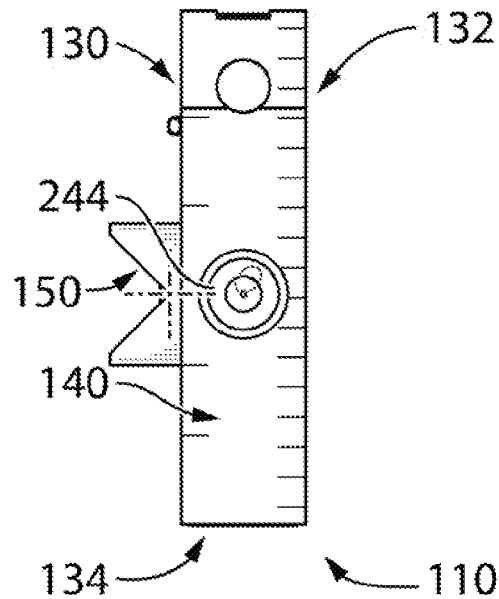
FIG. 6 is an orthogonal view of the layout and guide tool embodiment of FIG. 1, showing a portion of the curved side containing the bull's eye spirit level.
Figure 7:
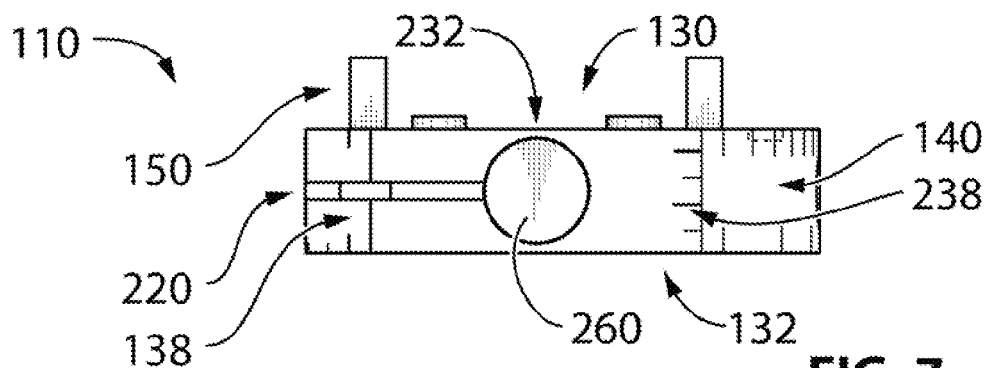
FIG. 7 is an orthogonal view of the layout and guide tool embodiment of FIG. 1, showing the corner span, bottom side and a portion of the curved side.
Figure 8:
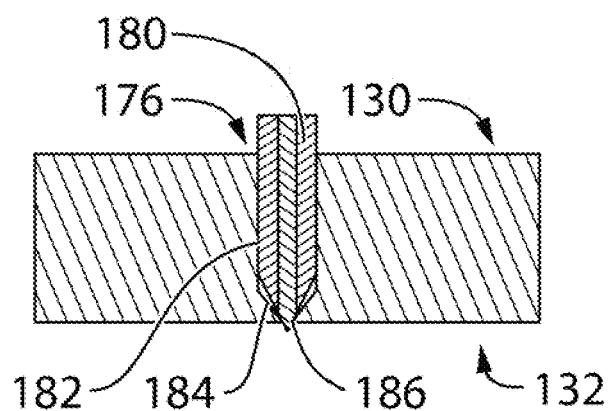
FIG. 8 is a sectional view of a scribe hole of the layout and guide tool embodiment of FIG. 1.
Figure 9:
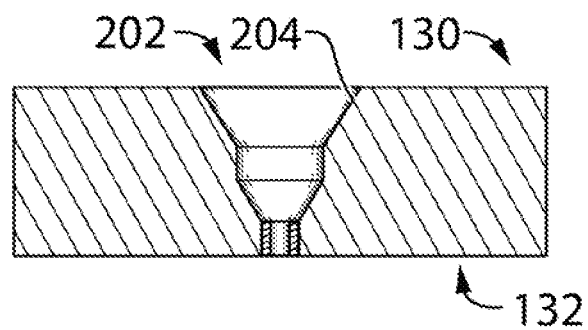
FIG. 9 is a sectional view of the 1/16 support guide of the layout and guide tool embodiment of FIG. 1.
Figure 10:
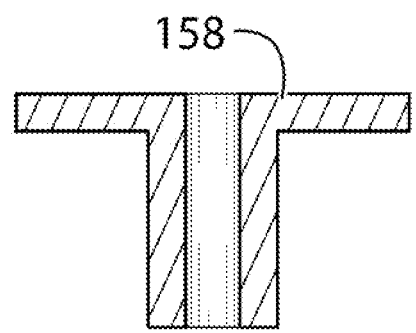
FIG. 10 is a sectional view of a center hole bushing of the layout and guide tool embodiment of FIG. 1.
Figure 11:
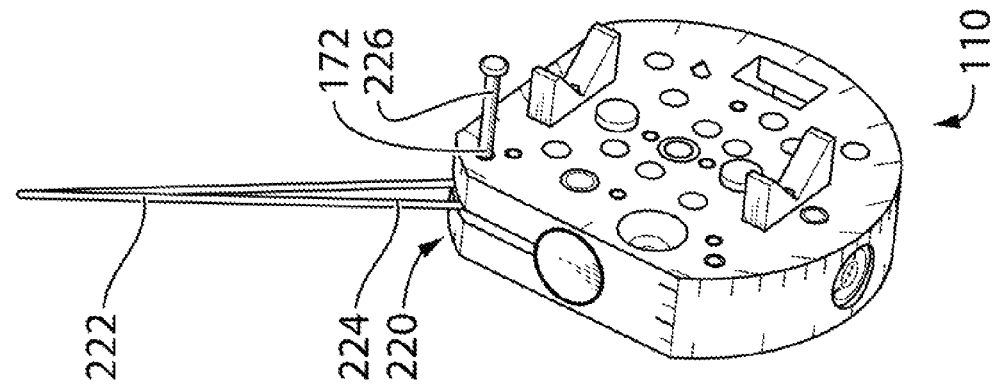
FIG. 11 is a perspective view of the layout and guide tool embodiment of FIG. 1, shown suspended by a string and nail so as to provide plumb bob features.
Figure 12:
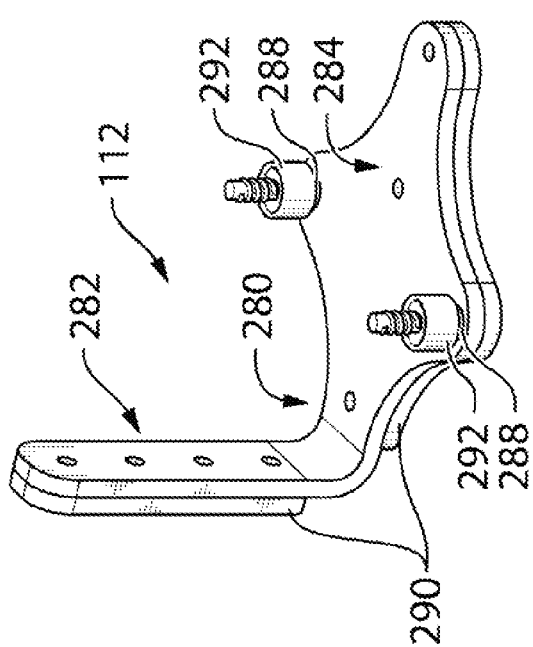
FIG. 12 is an upper perspective view of an L bracket embodiment of the present invention.
Figure 13:
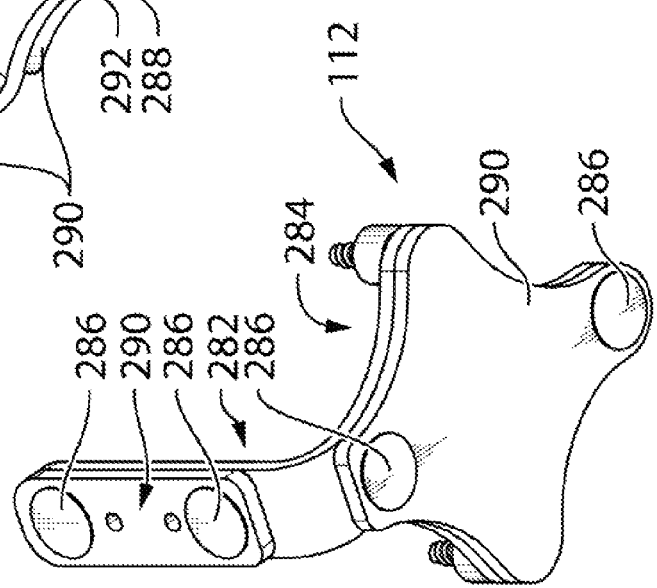
FIG. 13 is a lower perspective view of the L bracket embodiment of FIG. 12.

At times in this specification and the claims, terms suggesting an absolute orientation (e.g., top, bottom, up, down, etc.) are used. However, this is only for convenience and clarity of explanation. The components described herein may be used in various orientations, including ones contrary to the suggested absolute orientation.

As shown in the drawings, embodiments of the present invention include a layout and guide tool 110, L bracket 112, laser 114, swivel stand 116, headband 118 and lamp 120.

The laser 114 is a relatively small battery-powered handheld device akin to a laser pointer. The laser 114 has a cylindrical body and the laser beam that the laser 114 emits when in use, is aligned with the axis of rotation of the cylindrical body.

The layout and guide tool 110 comprises a front face 130, a guide face 132, a bottom side 134, a left side 136, a corner span 138, a curved side 140, and a center hole 142 extending between the front face 130 and the guide face 132 and having a center hole axis 144.

The layout and guide tool 110 may be made from any material suitable for the sort of wear typically imposed on hand tools. Preferably, the layout and guide tool 110 is made from a dense and hard material, such as ultra-high-molecular-weight polyethylene. Other potential materials for the layout and guide tool 110 include aluminum, Delrin™ and Marithane™. Depending on the material selected, it may be desirable to line the pilot guides (discussed below) with a material with greater wear resistance. For example, suitably sized steel sleeves may be press fit in the pilot guides.

In the embodiment shown in the drawings, layout and guide tool 110 has the following general configuration. The front face 130 and guide face 132 are parallel to each other. The curved side 134 has a constant radius and is essentially a section of a cylinder centered on the center hole axis 144. The bottom side 134 and left side 136 are at right angles to each other and are essentially chords of the cylinder defining the curved side 140. The corner span 138 is also a section of the cylinder defining the curved side 140. In the embodiment shown in the drawings, the front face 130 and guide face 132 are spaced apart about 1 inch, the diameter of the cylinder defining the curved side 140 is about 3⅝ inches, the curved side 140 extends about 180 degrees, and the bottom side 134 and left side 136 are each about 2 inches long.

The guide face 132 includes two projecting spaced-apart aligned V-jigs 150. Each V-jig 150 defines a 90 degree angle between the arms of the relevant V. Each V-jig 150 includes two V-tips 152, with one V-tip 152 at each end of the arms of the V. In the layout and guide tool 110 embodiment shown in the drawings, each V-jig 150 measures approximately 2.5 cm long and 0.7 cm wide. The V-tips 152 terminate about 1 cm from the adjacent surface of the front face 130.

The V-jigs 150 are equidistant from the center hole axis 144. The V-jigs 150 together define a V-jig axis 154 being an axis passing through the center of each V and intersecting the center hole axis 144. The V-jig axis 154 is parallel to the plane defined by the bottom side 134 and the V-jig axis 154 is perpendicular to the plane defined by the left side 136.

Associated with each V-jig 150 is a V-jig pilot guide 156 extending between the front face 130 and the guide face 130. In use, the V-jigs 150 may be used to create a pilot hole bisecting a right-angle corner, by positioning the V-jigs 150 against the corner and then drilling through one of the V-jig pilot guides 152 into the corner. Similarly, the V-jigs 150 may be used to create a pilot hole centered in cylindrical material (e.g., dowels), by securing the V-jigs 150 against the cylindrical material with the V-jig axis 154 aligned with the axis of rotation of the cylindrical material and then drilling through one of the V-jig pilot guides 152 into the cylindrical material. In the embodiment shown in the drawings, the V-jig pilot guides 152 are 5/64 inch in diameter and thus are suitable for guiding a 5/64 inch drill bit.

The V-jigs 150 may also be used to create a pilot hole centered in cylindrical material having a diameter too large to permit ready alignment of the V-jig axis 154 with the axis of rotation of the cylindrical material. With such large diameter material, the spacing apart of the V-jigs 150 permits the V-tips 152 to be positioned against the cylindrical material with the V-jig axis 154 normal to the axis of rotation of the cylindrical material. A pilot hole may then be drilled through the center hole 144.

In the embodiment shown in the drawings, the diameter of the center hole 142 is 9/32 inch and thus is suitable for guiding a 9/32 inch drill bit. A center hole bushing 158 may be inserted into the center hole 142 so as to guide a drill bit smaller than 9/32 inch. Different center hole bushings 158 have different internal diameters. An exemplary center hole bushing 158 is shown in the drawings.

Similarly, the V-jigs 150 may also be used to create a pilot hole in a body having a complex curve, by positioning the V-tips 152 against the body and drilling through the center hole 142. It will be apparent that with bodies having a constant complex curve, pilot holes created in this manner will be normal to the immediately adjacent surface of the body.

The layout and guide tool 110 also includes a scribing array 170 suitable for marking circles having diameters going from 1 inch to 6 inches, in half inch increments. The scribing array 170 includes a left anchor hole 172, a right anchor hole 174 and ten scribe holes 176. The scribing array 170 also utilizes the center hole 142.

The left anchor hole 172 and right anchor hole 174 extend between the front face 130 and the guide face 132. The left anchor hole 172 is located adjacent the left end of the bottom side 134. The right anchor hole 174 is located adjacent the right end of the bottom side 134. In the embodiment shown in the drawings, the left anchor hole 172 and right anchor hole 174 are configured so as to receive a nail of a common size or a drywall screw.

The scribe holes 176 are configured for supporting a conventionally sized pencil 180. Each scribe hole 176 comprises a 9/32 inch pencil body bore 182 extending from the front face 130 and a taper 184 leading to a 1/8 inch pencil tip opening 186 in the guide face 132. The center hole 142 is also used to support a conventionally sized pencil 180, though marginally less securely than the scribe holes 176, in that the center hole 142 does not have features corresponding to the taper 184 and pencil tip opening 186.

Extending in a line from the left anchor hole 172 is a linear row consisting of two scribe holes 176, the center hole 142 and three more scribe holes 176, spaced apart one from the other 1/2 inch. Extending in a line from the right anchor hole 174 is a linear row consisting of one scribe hole 176, the center hole 142 and two more scribe holes 176, spaced apart one from the other 3/4 inch. In addition, there are two unaligned scribe holes 176 adjacent to the center hole 142, one 1 1/4 inches from the right anchor hole 174 and the other 1 3/4 inches from the right anchor hole 174.

In use, circles and portions of circles, having diameters going, in half inch increments, from 1 inch to 6 inches, may be scribed by: anchoring the layout and guide tool 110 to the surface to be scribed (by, depending on the nature of the surface, merely using hand pressure to press the point of a nail or screw into the surface, or partially driving a nail or screw into the surface using conventional driving means) whichever of the left anchor hole 172 and right anchor hole 174 is the suitable anchor hole for the desired diameter; inserting a pencil into the relevant scribe hole 176 or center hole 142 so as to bring the pencil tip into contact with the surface to be scribed; and rotating the layout and guide tool 110 about the nail or screw.

The scribing array 170 may also be used to mark a desired offset from an edge with an irregular curve by: inserting a nail 226 into the front face 130 through one or the other of the left anchor hole 172 and the right anchor hole 174, such that the nail 226 projects out of the guide face 132; positioning the guide face 132 on the surface to be marked with the projecting portion of the nail abutting the edge with the irregular curve; inserting a pencil 180 into a scribe hole 176 at the desired offset distance; and moving the layout and guide tool 110 along the edge while maintaining contact between the edge and the nail 226.

The layout and guide tool 110 also includes normal drill guides 200, extending between the front face 130 and the guide face 132 for assisting the user in making a hole perpendicular (or normal) to a surface to be drilled. In the embodiment shown in the drawings, the normal drill guides 200 are sized for use with 5/64, 3/32, 7/64, 1/8, 5/32 and 7/32 inch drill bits. The center hole 142 functions as a drill guide for 9/32 inch drill bits.

The layout and guide tool 110 also includes a 1/16 enlarged guide 202 for use with 1/16 inch drill bits. The 1/16 enlarged guide 202 has an enlarged chamfered opening 204 at the front face 130 to accommodate a portion of the drill chuck containing a 1/16 inch drill bit (which are generally short in length).

The layout and guide tool 110 also includes a 7/64 45 degree guide 206 for in use making 7/64 inch holes at 45 degrees to a surface to be drilled.

The layout and guide tool 110 also includes a plumb slot 220, extending from the bottom side 134 across the corner span and into the left side 136. The plumb slot 220 intersects the right anchor hole 174. In use, the layout and guide tool 110 may be connected to a string 222 (for example a chalk line) so as to provide plumb-bob features, by making a loop 224 in an end of the string 222 and securing the loop 224 to the layout and guide tool 110 by placing the loop 224 in the plumb slot 220 and inserting a nail 226 (or screw, drill bit etc.) into the right anchor hole 174 and through the loop 224.

Utilizing a fastener (e.g., a nail or screw) to secure a loop to the layout and guide tool 110, enables a user to quickly set vertically aligned positions on a vertical surface, in that when the layout and guide tool 110 is suspended by a string attached to a fixed point (i.e., an upper fastener), then the aligned vertical position of the string-suspended layout and guide tool 110 may be fixed by partially driving the fastener used to connect the loop into the wall (so as to become a "lower fastener"). If the string 222 is a chalk line, the chalk line may be used to snap a vertical line on the vertical surface. In addition, or alternatively, a tape measure may be hooked to each of the upper fastener and lower fastener so as to measure and mark desired offsets from these aligned vertical positions.

A fastener (e.g., a nail or screw) may similarly be used to secure the bent end of a length of wire (or other suitable inelastic material) to the layout and guide tool 110, for the purpose of marking relatively large diameter regular curves. In such use, the opposite end of the length of wire is looped around a fastener located at the center of the desired curve. A pencil 180 is inserted in a scribe hole 176 at the desired radial distance from the center and the layout and guide tool 110 is moved along the desired arc. The support to the pencil 180 provided by the layout and guide tool 110 maintains the pencil 180 in a constant perpendicular orientation to the surface to be marked, so as to reduce errors that might otherwise arise were the pencil 180 merely held by hand in a loop of wire.

A length of wire (or other suitable inelastic material) secured to the layout and guide tool 110 may also be used to locate a line perpendicular to a set location on another line (e.g., an existing wall), by marking curves having the same radius from centers at equal offsets on either side of the set location. The point of intersection of such curves is perpendicular from the set location.

The layout and guide tool 110 embodiment shown in the drawings includes various markings, including: markings associated with the scribing array 170, setting out the diameter of the circle that may be scribed with each scribe hole 176; and markings indicating the size of the normal drill guides 200, 1/16 support guide 202 and 7/64 45 degree guide 206.

The layout and guide tool 110 embodiment shown in the drawings also includes two sets of protractor degree markings 230 with the protractor apex 232 located at the middle of the bottom side 134. One of the sets of protractor degree markings 230, located about the periphery of the front face 130, reads counterclockwise, meaning that degree units increase in a counterclockwise direction. The other of the sets of protractor degree markings 230, located on the corner span 138, left side 136 and curved side 140 adjacent to the front face 130, reads clockwise, meaning that degree units increase in a clockwise direction.

The layout and guide tool 110 embodiment shown in the drawings also includes linear measurement markings 234 (i.e., distinct inch, 1/4 inch and 1/8 inch markings) around the periphery of the guide face 132, for use in making linear measurements. The layout and guide tool 110 embodiment shown in the drawings also includes imperial depth markings 236 (on the left side 136 adjacent the curved side 140) and metric depth markings 238 (on the bottom side 134 adjacent the curved side 140).

The layout and guide tool 110 embodiment also preferably includes a bisect mark on the curved side 140 where the curved side intersects a plane bisecting the angle defined by the intersection of a plane defined by the bottom side 134 and a plane defined by the left side 136. The bisect mark may be used to bisect a right angle corner by locating the layout and guide tool 110 with the bottom side 134 and left side 136 aligned with a respective side of the corner and then marking the material at the bisect mark ???. A line drawn from the corner through the mark bisects the corner. Such bisecting lines have many uses, including rounding the corner to a desired radius, by securing left anchor hole 172 or right anchor hole 174 at the center of the radius with a fastener and then using one of the scribe holes 176 and a pencil 180, to mark the desired curve.

The different marking are preferably distinguished one from the other by use of different colours.

The layout and guide tool 110 includes a tubular spirit level 240 and three tubular spirit level windows 242 to enable viewing of the tubular spirit level 240 from the front face 130, guide face 132 and curved side 140. The tubular spirit level 240 is aligned with the V-jig axis 154 and the plane defined by the bottom side 134 (as set out above, the V-jig axis 154 and the plane defined by the bottom side 134 are parallel).

The layout and guide tool 110 includes a bull's eye spirit level 244 visible in the curved side 140. The bull's eye spirit level 244 is aligned with the plane defined by the left side 136. Thus, when the bull's eye spirit level 244 indicates that the plane defined by the left side 136 is horizontal (i.e., "level"), the V-jig axis 154 is vertical (as set out above, the V-jig axis 154 and the plane defined by the left side 134 are perpendicular).

Depending on the precision obtainable in the manufacturing process, it may be desirable to enable the user to true (i.e., make fine adjustments to the orientation of) the tubular spirit level 240 and/or the bull's eye spirit level 244.

The layout and guide tool 110 includes two large V-jig magnets 250 and one small V-jig magnet 252 adjacent to the V-jigs 150 and in a row aligned with the V-jig axis 154. The large V-jig magnets 250 and small V-jig magnet 252 are permanent magnets with magnetic fields of sufficient strength to retain the laser 114 in the V-jigs 150 with the laser beam of the laser 114 in alignment with the V-jig axis 154.

The V-jig magnets 250 are preferably rare earth magnets. The large V-jig magnets 250 preferably each comprises six rare earth disc magnets measuring approximately 3/8×1/10 inches. The small V-jig magnet 252 preferably comprises six rare earth disc magnets measuring approximately 1/4×1/10 inches.

The layout and guide tool 110 includes a bottom side magnet 260 centered in the bottom side 134 and a left side magnet 262 centered in the left side 136. The bottom side magnet 260 and left side magnet 262 are permanent magnets, each with a magnetic field of sufficient strength to retain the layout and guide tool 110 and laser 114 in position relative to a ferromagnetic body. The bottom side magnet 260 and left side magnet 262 are preferably rare earth magnets. Each of the bottom side magnet 260 and left side magnet 262 preferably comprises two rare earth disc magnets measuring approximately 3/4×1/8 inches.

The swivel stand 116 comprises an articulating joint 270 and two swivel stand magnets 272. The articulating joint 270 is configured to be releasably securable in a range of bent and rotated positions. Suitable articulating joints 270 include ball and socket typed articulating joints such as developed for use in photography, e.g., the Ballhead X™ articulating stand as provided by the JOBY company.

The swivel stand magnets 272 are permanent magnets, each with a magnetic field of sufficient strength to retain the layout and guide tool 110, laser 114 and swivel stand 116 in position relative to a ferromagnetic body. The swivel stand magnets 272 are preferably rare earth magnets. Each of the swivel stand magnets 272 preferably comprises two rare earth disc magnets measuring approximately 3/4×1/8 inches.

The L bracket 112 comprises a bracket body 280 having a longitudinal portion 282 and a shelf portion 284. In the embodiment shown in the drawings, the longitudinal portion 282 is about 4 inches in length. The shelf portion 284 extends about 3½ inches perpendicularly from the longitudinal portion 282 and measures about 2½ inches at its widest extent.

The L bracket 112 includes four large L bracket magnets 286 and two small L bracket magnets 288. The large L bracket magnets 286 and small L bracket magnets 288 are preferably rare earth magnets. Each of the large L bracket magnets 286 is preferably two rare earth disc magnets measuring approximately 3/4×1/8 inches. Each of the small L bracket magnets 288 is preferably a rare earth disc magnet measuring approximately 1/2×1/10 inches.

The surfaces of the L bracket 112 containing the large L bracket magnets 286 comprise a dense foam backing 290.

The longitudinal portion 282 includes bracket holes, suitable for receiving fasteners (e.g., nails or screws) for attaching the L bracket 112 to non-magnetic bodies. Associated with the L bracket 112 are two bracket mounting screws 292 suitable for releasably affixing the L bracket 112 to various materials (e.g., drywall, softwood). As shown in the drawings, the bracket mounting screws 292 may be retained with the L bracket 112 by the small L bracket magnets 288.

Figure 14:
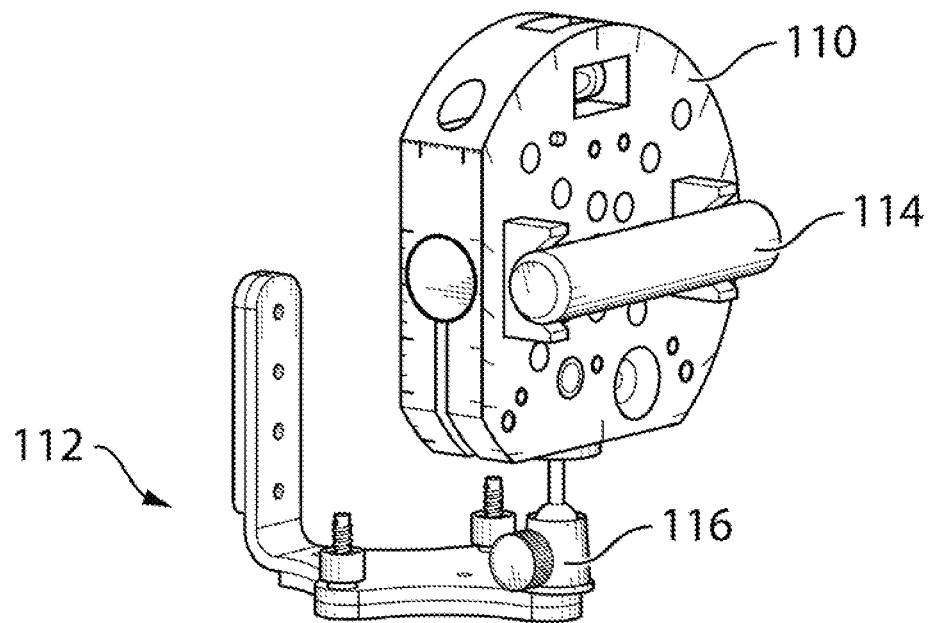
FIG. 14 is a perspective view showing embodiments of the layout and guide tool, laser, swivel stand and L bracket, shown with the laser in the V-jigs and oriented horizontally.
Figure 15:
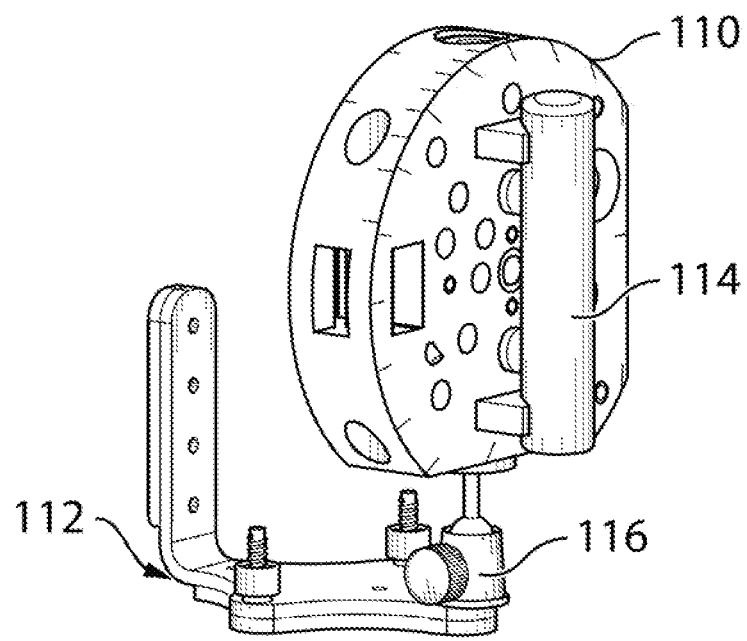
FIG. 15 is a perspective view showing embodiments of the layout and guide tool, laser, swivel stand and L bracket, shown with the laser in the V-jigs and oriented vertically.
Figure 16:
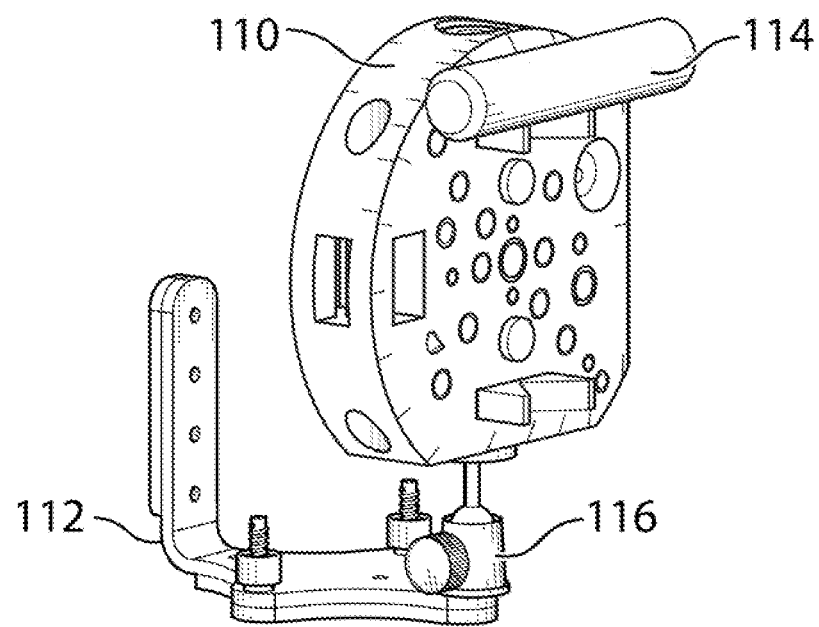
FIG. 16 is a perspective view showing embodiments of the layout and guide tool, laser, swivel stand and L bracket, shown with the laser atop the uppermost V-jig and oriented horizontally.

As shown in FIGS. 14-16, the L bracket 112 may be attached to a vertical surface (magnetically or via fasteners), and the layout and guide tool 110 may be supported by the L bracket 112 via the swivel stand 116. Two orientations of the layout and guide tool 110 are shown in the drawings, being with the V-jig axis 154 oriented vertically (FIGS. 15 and 16) and with the V-jig axis 154 oriented horizontally (FIG. 14). For most purposes, the V-jig axis 154 oriented vertically will be preferable in that in this orientation, the bull's eye spirit level 244 is top most and thus the layout and guide tool 110 may be leveled in all directions (as opposed to in one direction, which is the leveling available when the tubular spirit level is top most). Once the layout and guide tool 110 has been leveled in the vertical V-jig axis 154 orientation, the laser 114 may be moved between vertical orientation (in most instances with the laser directed towards the floor) with the laser 114 in the V-jigs 150 (FIG. 15), and horizontal orientation, with the laser resting on the horizontal face of the uppermost of the V-jigs 150 and secured in position by the small V-jig magnet 252.

The headband 118 comprises an adjustable head strap 300 (preferably elastic) and a headband mount 302. The headband mount 302 is preferably includes a rare earth magnet but may merely be ferromagnetic.

The lamp 120 is a relatively small battery-powered handheld device akin to flashlight (preferably with one or more LED lights), having a ferromagnetic body feature such that the lamp 120 may be held in position by a magnet.

Figure 17:
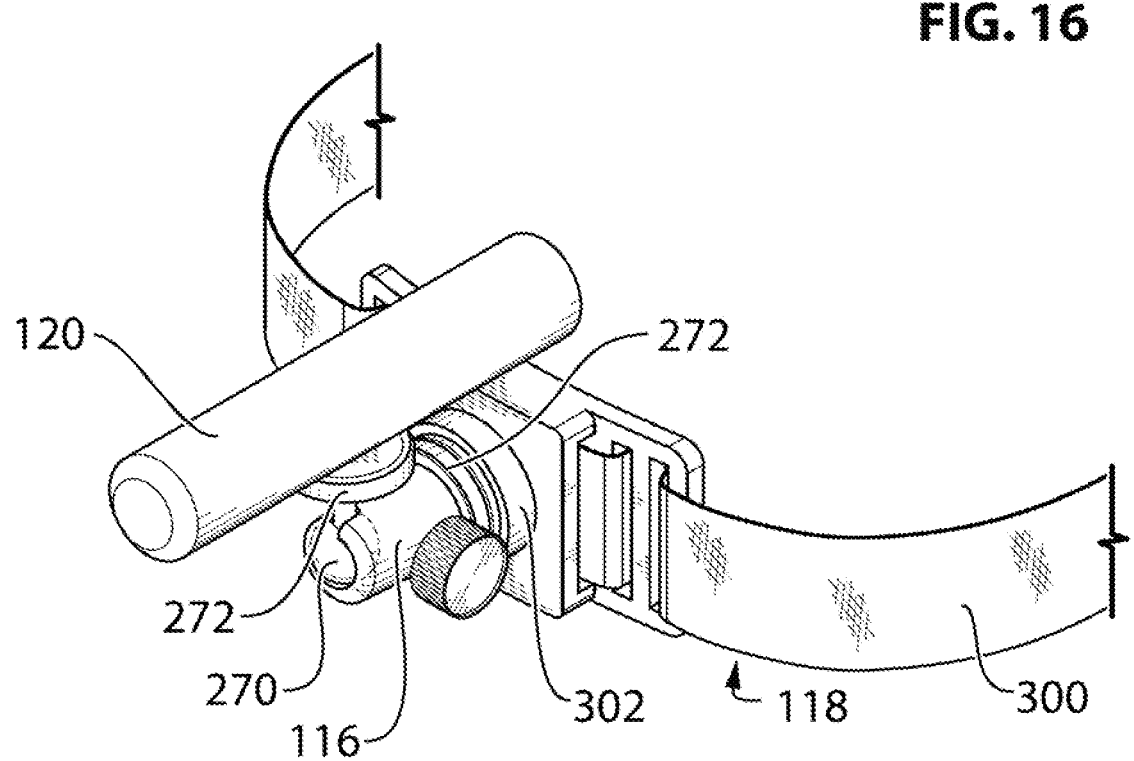
FIG. 17 is a perspective view showing embodiments of the swivel stand, headband and lamp.

As shown in FIG. 17, the lamp 120 may be attached to the headband 118 via the swivel stand 116 and the lamp 120 may be aimed as desired using the articulating joint 270.

Embodiments of the present invention, may be used to provide the following functions: drilling pilot holes; drawing circles and arches; rounding corners; drawing borders; measuring and drawing angles, and the intersection of angles; "squaring" right angles; centering square and round stock, and facilitating drilling centred pilot holes in same; measurement of lengths and thicknesses; "leveling" walls, ceilings, doors, and windows; "leveling" uphill and downhill on straight surfaces; "leveling" uphill and downhill on surfaces; "leveling" shelves, counter tops, objects to be hung on walls and from ceilings; "leveling" boat "boot" lines and making horizontal/vertical paint lines on curved boat hulls; lines up doors and fenders, trim, and paint lines in an auto-body shop; adjustable, portable light; and a headlamp.

What is claimed is:

1. A drill guide and layout tool comprising:
   a block member;
   two spaced-apart V-jigs projecting from the block member, wherein each V-jig has a V-shaped opening defined by two angled apart V-sides and having two V-tips, one V-tip at the distal end of each V-side, and the V-shaped openings are aligned such that together the V-shaped openings define a V-jig axis passing through the bottom of each V-shaped opening; and
   a center drill guide hole through the block member at a location centered between the V-jigs and aligned with the V-jig axis;
   wherein, the tool may be used to guide a drill by: in the case of longitudinally extending material of an appropriate size and configuration, placing the tool against the material with the V-jig axis aligned with the longitudinal axis of the material; or in the case of longitudinally extending material having a profile that does not permit aligned insertion within the V-shaped openings or a non-longitudinally extending material having a complex curved surface, bringing the four V-tips into contact with the material
   wherein the block member further comprises a scribing array for use with a pencil or other scribing tool in scribing regular curves, the scribing array comprising:
      at least a first anchor hole through the block member and configured for insertion of a fastener therethrough;
      the center drill guide hole, wherein the center guide hole is configured for supporting a scribing tool; and
      a plurality of scribe holes through the block member and configured for supporting a scribing tool, and along with the center drill guide hole, spaced apart in first increments from the first anchor hole;
   whereby a user may scribe a regular curve of a desired first set of radii by inserting a fastener through the first anchor hole at the center of the curve and inserting a scribing tool into the one of the scribe holes and center drill guide hole providing the desired radius from the first set of radii; and
   wherein a loop of string may be secured to the block member for use in suspending the block member as a plumb bob, in that the block member further comprises a plumb slot intersecting the first anchor hole, whereby a loop of string may be inserted into the plumb slot and secured therein by inserting a fastener into the first anchor hole through the loop of string.

2. The drill guide and layout tool of claim 1, wherein in each V-jig, the V-sides are angled apart 90 degrees.

3. The drill guide and layout tool of claim 1, further comprising one or more additional drill guide holes through the block member and aligned with the V-jig axis, and each additional drill guide hole being a different size from the center drill guide hole.

4. The drill guide and layout tool of claim 1, wherein:
   the block member further comprises a first leveling means for orienting the V-jig axis vertically; and
   at least one of the V-jigs defines a V-jig support extending normal to the V-jig axis; and
   the drill guide and layout tool further comprises a laser having a laser axis that is parallel to the V-jig axis when the laser is in aligned insertion within the V-shaped openings and that is perpendicular to the V-jig axis when the laser is supported by the V-jig support.

5. The drill guide and layout tool of claim 4, wherein the laser comprises ferromagnetic material and the block member further comprises one or more magnets for releasably securing the laser in position when in aligned insertion within the V-shaped openings and when supported by the V-jig support.

6. The drill guide and layout tool of claim 4, wherein the first leveling means comprises a bull's eye spirit level.

7. The drill guide and layout tool of claim 4, wherein the block member further comprises a second leveling means, being a tubular level configured for leveling the block member with the V-jig axis horizontal.

8. The drill guide and layout tool of claim 1, wherein the scribing array further comprises:
   a second anchor hole through the block member and configured for insertion of a fastener therethrough; and
   a plurality of additional scribe holes, along with the center drill guide hole, spaced apart in second increments from the second anchor hole;
   whereby a user may scribe a regular curve of a desired second set of radii by inserting a fastener through the second anchor hole at the center of the curve and inserting a scribing tool into the one of the additional scribe holes and center drill guide hole providing the desired radius form the second set of radii.

9. The drill guide and layout tool of claim 1, wherein the block member comprises a plurality of drill guide bores.

10. The drill guide and layout tool of claim 1, wherein the block member comprises two spaced apart opposed parallel faces and a drill guide bore oriented at 45 degrees to the faces.

11. The drill guide and layout tool of claim 1, wherein the block member comprises a 1/16 inch drill bit guide including an enlarged opening for accommodating a drill chuck containing a 1/16 inch drill bit.

12. The drill guide and layout tool of claim 1,
further comprising a swivel mount having a swivel mount component of a ferromagnetic connector, and an articulating joint releasably fixable in various swivel orientations; and
wherein the block member comprises:
    a first leveling means, being a bull's eye spirit level, for orienting the V-jig axis vertically;
    a second leveling means, being a tubular spirit level, for orienting the V-jig axis horizontally;
    a first side that is planar and normal to the V-jig axis
    a second side that is planar and normal to the second side, wherein the first and second sides define planes that intersect at 90 degrees,
    two block member components of a ferromagnetic connector, one in the first side and another in the second side;
    whereby, the swivel mount may be ferromagnetically connected to either of the first side or second side, and the block member may be releasably positioned with the V-jig axis oriented vertically or horizontally using the articulable joint and one or the other of the bull's eye spirit level and the tubular spirit level.

13. The drill guide and layout tool of claim 12, wherein
the swivel mount comprises a second swivel mount component of a ferromagnetic connector; and
the drill guide and layout tool further comprising an L bracket comprising bracket components of ferromagnetic connectors
wherein the L bracket may be ferromagnetically attached to a suitable surface and the swivel mount may be ferromagnetically connected to the L bracket,
whereby the L bracket may be used to support the swivel mount and block member.

14. The drill guide and layout tool of claim 12, wherein the ferromagnetic connectors comprise rare earth magnets.

15. The drill guide and layout tool of claim 1, wherein the block member comprises at least one of, protractor markings, scribe array markings, drill guide size markings, linear measurement markings, and depth markings.

* * * * *